United States Patent [19]

Fukunaga

[11] 4,309,012
[45] Jan. 5, 1982

[54] INSTRUMENT MOUNTING STRUCTURE

[75] Inventor: Yukio Fukunaga, Yokohama, Japan

[73] Assignee: Nissan Motor Company, Limited, Kanagawa, Japan

[21] Appl. No.: 75,180

[22] Filed: Sep. 12, 1979

[30] Foreign Application Priority Data

Sep. 21, 1978 [JP] Japan .............. 53-129820[U]

[51] Int. Cl.³ .............................................. G12B 9/00
[52] U.S. Cl. .................................... 248/27.1; 296/37.12
[58] Field of Search .................. 248/27.1; 180/90; 296/37.12

[56] References Cited

U.S. PATENT DOCUMENTS

| | | | |
|---|---|---|---|
| 945,049 | 1/1910 | Russell | 180/90 UX |
| 3,270,831 | 9/1966 | Woofter et al. | 180/90 |
| 3,361,400 | 1/1968 | Webb | 248/27.1 |
| 3,708,850 | 1/1973 | Martin | 248/27.1 |
| 3,958,857 | 5/1976 | Schultz | 248/27.1 X |
| 4,063,661 | 12/1977 | Doby | 248/27.1 X |
| 4,066,838 | 1/1978 | Fujita | 248/27.1 X |
| 4,169,624 | 10/1979 | Yefsky | 248/27.1 X |

FOREIGN PATENT DOCUMENTS

| | | |
|---|---|---|
| 6803165 | 10/1968 | Fed. Rep. of Germany . |
| 2349654 | 4/1975 | Fed. Rep. of Germany . |
| 2511002 | 4/1976 | Fed. Rep. of Germany . |
| 2801906 | 8/1978 | Fed. Rep. of Germany . |

*Primary Examiner*—J. Franklin Foss
*Attorney, Agent, or Firm*—Lowe, King, Price & Becker

[57] ABSTRACT

A structure for mounting an instrument to a recessed instrument panel within the recess thereof is disclosed. The instrument panel recess is formed on its inner surface with hook means. At least one lock device is fixedly secured on the instrument. The lock device includes a base plate secured on the instrument, a lock member supported on the base plate for sliding movement at an angle with respect to the direction of insertion of the instrument into and out of engagement with the hook member, and a snap-action mechanism secured on the base plate and coupled to the lock member. The snap-action mechanism has its condition changed so as to hold the lock member in engagement with the hook member under a force when the instrument is advanced into the recess to a predetermined position and returned to its original condition so as to bring the lock member out of engagement with the hook member when the instrument is retracted against the force from the predetermined position.

3 Claims, 5 Drawing Figures

INSTRUMENT MOUNTING STRUCTURE

BACKGROUND OF THE INVENTION

1. Field of the Invention

This invention relates to a structure for mounting an indicating instrument to a support panel such as a vehicle instrument panel and, more particularly, to an instrument mounting structure permitting easy and certain mounting of an instrument to an instrument panel.

2. Description of the Prior Art

It is conventional practice of use fasteners such as screws and nuts to mount an indicating instrument to a vehicle instrument panel. However, this requires much man-hours to register the screw holes of the instrument with the mating screw holes of the instrument panel and fasten them by screws. In addition, the screws would get loose due to vehicle vibrations, eventually causing separation of the indicating instrument from the instrument panel.

SUMMARY OF THE INVENTION

It is therefore one object of the present invention to provide an improved instrument mounting structure which can mount an instrument to an instrument panel with greater ease and certainty merely by pushing the instrument into the recessed instrument panel.

Another object of the present invention is to provide an improved instrument mounting structure which can positively hold the instrument installed in the instrument panel recess without separation of the same from the instrument panel even under heavy vehicle vibrations.

Still another object of the present invention is to provide an improved instrument mounting structure which permits easy separation of the instrument from the instrument panel if desired.

These objects are accomplished, in accordance with the present invention, by providing a new and improved structure for mounting an instrument to a recessed instrument panel within the recess thereof. The instrument panel recess is formed on its inner surface with hook means. At least one lock device is fixedly secured on the instrument. The lock device includes a base plate secured on the instrument, a lock member supported on the base plate for sliding movement at an angle with respect to the direction of insertion of the instrument into and out of engagement with the hook means, and a snap-action mechanism secured on the base plate and coupled to the lock member. The snap-action mechanism has its condition changed so as to hold the lock member in engagement with the hook means under a force when the instrument is advanced into the recess to a predetermined position and returned to its original condition so as to bring the lock member out of engagement with the hook means when the instrument is retracted against the force from the predetermined position.

BRIEF DESCRIPTION OF THE DRAWINGS

Other objects and advantages of the present invention will become apparent upon reading the following detailed description and upon reference to the drawings, in which.

While the present invention will be described in connection with a preferred embodiment, it will be understood that it is not intended to limit the invention to this embodiment. On the contrary, it is intended to cover all alternatives, modifications and equivalents that may be included within the spirit and scope of the invention as defined by the appended claims.

DETAILED DESCRIPTION OF THE INVENTION

Figure 1:
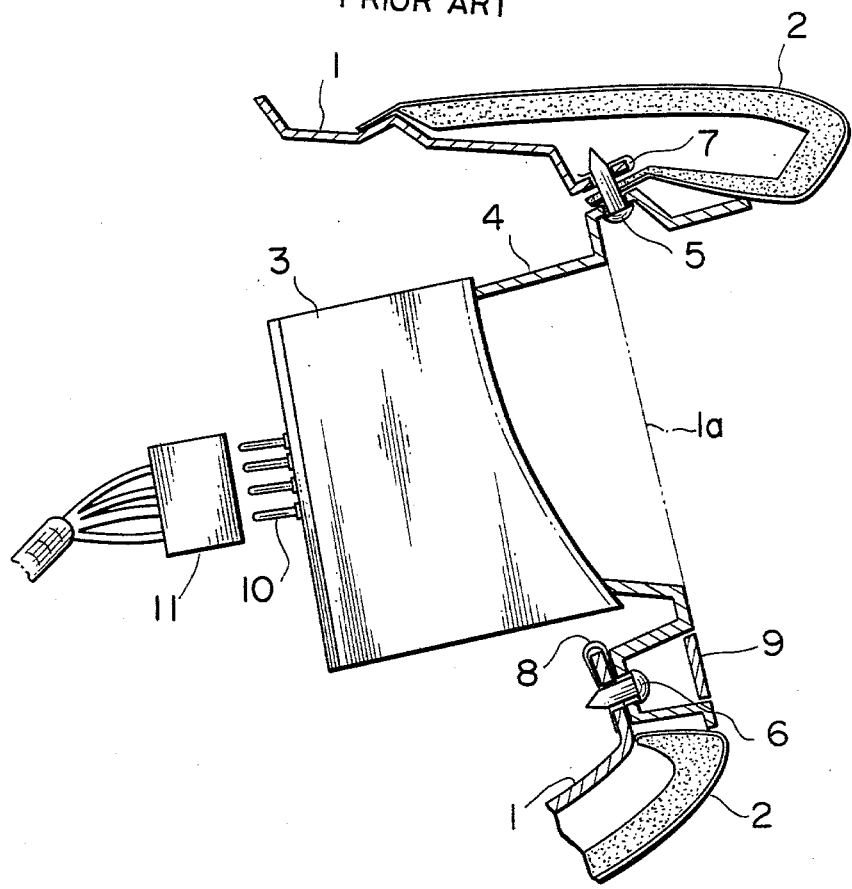
FIG. 1 is a sectional view showing a conventional mounting structure.

Referring first to FIG. 1, there is illustrated a conventional instrument mounting structure. In FIG. 1, the reference numeral 1 designates an instrument panel provided on its outer surface with pads 2 and having an opening 1a in which an indicating instrument 3 is placed. The indicating instrument 3 is formed integrally with a front hood 4 having its upper and lower edges fixedly secured to the instrument panel 1 by means of fasteners such as tapping screws 5 and 6 threadedly engaged with respective spring nuts 7 and 8. For the sake of a good finished appearance, the head of the upper screw 5 is placed in a downward facing pocket formed at the upper edge of the front hood 4 and the head of the lower screw 6 is placed in a forward facing pocket formed at the lower edge thereof and closed with a face board 9. The reference numeral 10 designates a multipolar connection terminal and the numeral 11 a connector for engagement with the terminal 10. With such a conventional instrument mounting structure, however, much man-hours have been required to register the screw holes of the hood with the mating screw holes of the instrument panel and to fasten them by screws within the pockets. Another disadvantage of the conventional structure is the tendency of the screws to get loose due to vehicle vibrations, eventually causing separation of the indicating instrument from the instrument panel. The present invention is intended to eliminate these disadvantages.

Figure 2:
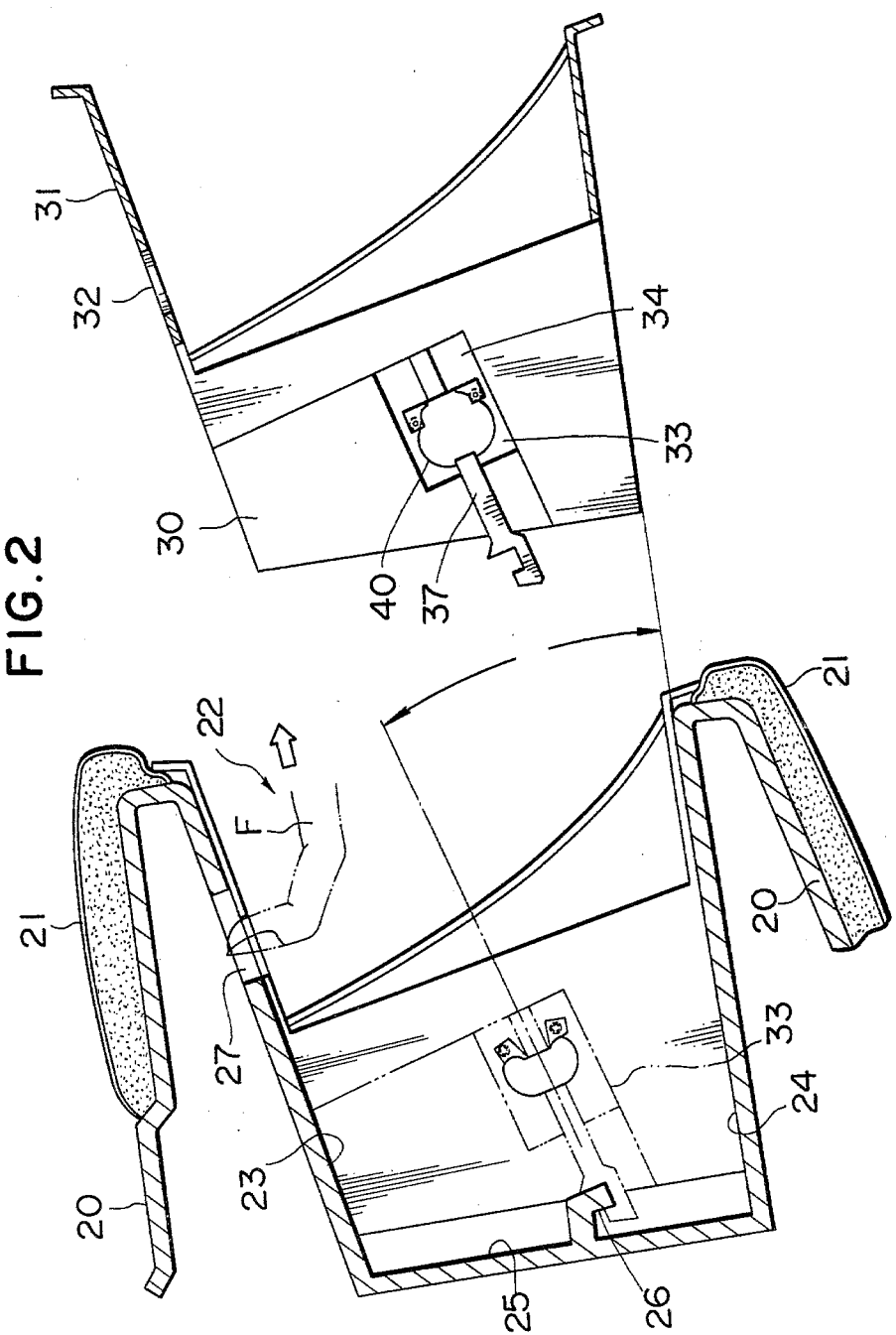
FIG. 2 is a sectional view showing one embodiment of an instrument mounting structure in accordance with the present invention.

Referring now to FIG. 2, there is illustrated an instrument mounting structure of the present invention as applied for mounting an indicating instrument to a vehicle instrument panel. The reference numeral 20 designates an instrument panel provided on its outer surface with pads 21. The instrument panel 20 is pressed to have a recess 22 defined by an upper wall 23, a lower wall 24, and an inner side wall 25 for receiving therein an indicating instrument 30 such as a speedometer, tachometer or the like. The recess 22 is slightly tapered to have its height decreasing toward the inner side wall 25. The inner side wall 25 is formed on its inner surface with a pair of hook member 26 (only one member is shown) having its tip end turned down at an angle. The upper wall 23 is formed with an elongated hole 27 for use upon separation of the indicating instrument 30 from the instrument panel 20.

The indicating instrument 30 is formed integrally with a hood 31 tapered to conform generally to the recess 22. The upper wall of the hood 31 is formed with an operation hole 32 at a position corresponding to the elongated hole 27 of the instrument panel 20. A pair of lock device 33 (only one device is shown) are secured to the opposite side surfaces of the indicating instrument 30.

Figure 3:
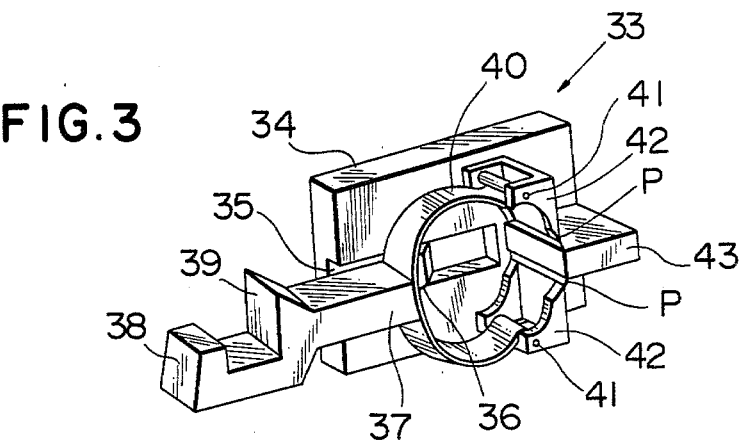
FIG. 3 is a perspective view showing a lock device incorporated in the instrument mounting structure of the present invention.

FIG. 3 shows in detail the lock device 33 which comprises a rectangular base plate 34 formed in its surface with a guide groove 35 and secured on one side surface of the indicating instrument 30 such that the guide groove 35 inclines at an angle $\alpha$ with respect to the lower wall of the indicating instrument 30 as shown in FIG. 2. The lock device 33 also comprises a guide member 36 slidably fitted in the guide groove 35 and a lock member 37 integrally fixed to the guide member 36. The lock member 37 has at its front end portion first and second fingers 38 and 39 projecting upward. The first finger 38 is shorter than the second finger 39. The lock device 33 further comprises a snap-action mechanism including a leaf spring 40 with its opposite ends coupled to pivot pins 41 secured to respective hinge members 42 connected in polypropylene (p.p.) hinge fashion (connection through a partially thinned foldable member formed of resin such as polypropylene or the like) to an upright wall 43 integrally fixed to the base plate 34 so that the leaf spring 40 is held curved in a U-shape. The center of the U-shaped leaf spring 40 is secured to the rear end of the lock member 37. Thus, the indicating instrument 30 having thereon the lock device 33 can be installed to the instrument panel merely by pushing the indicating instrument 30 from the position indicated by the solid lines of FIG. 2 into the recess 22 so as to bring the lock member 22 into engagement with the hook member 26.

Figure 4A:
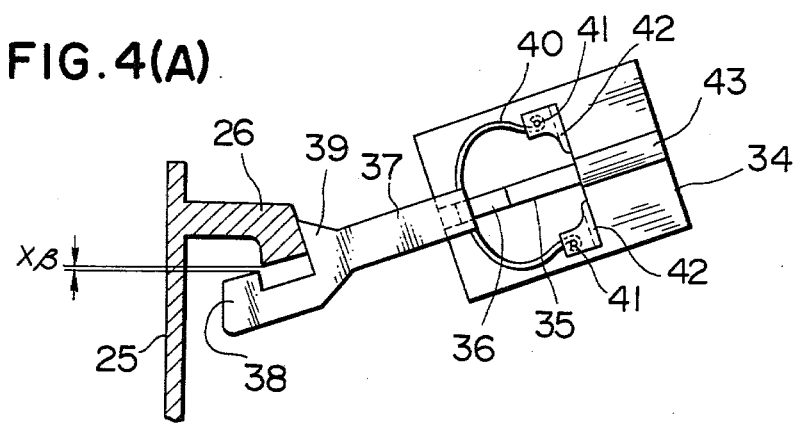
FIGS. 4A and 4B are views used in explaining the operation of the present invention.
Figure 4B:
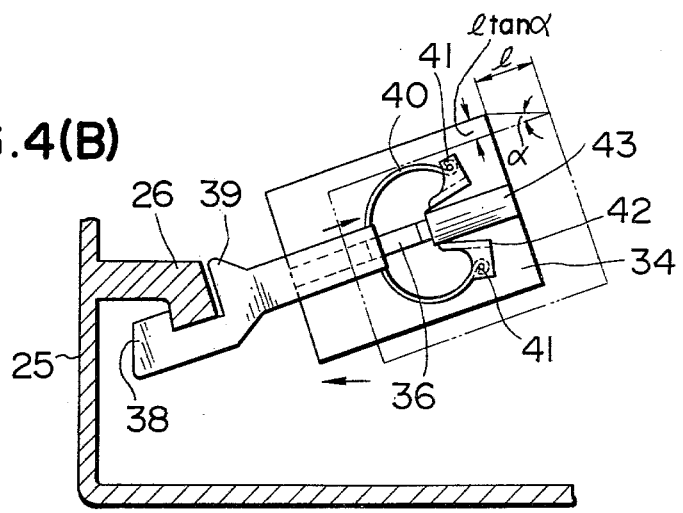

This will be described in more detail with reference to FIGS. 4A and 4B. First, the indicating instrument 30 is inserted into the recess 22 until the second finger 39 of the lock member 37 comes into abutment with the hook member 26. At this time, the first finger 38 of the lock member 37 is held out of engagement with the hook member 26 since it moves a distance $\beta$ below the lowermost edge of the hook member 26 as shown in FIG. 4A. When the indicating instrument 30 is pushed to cause its further forward movement, the base plate 34 advances while the second finger 39 of the lock member 37 is held in abutment with the hook member 26. Thus, the lock member 37 moves upward a distance l·tan $\alpha$ with respect to the base plate 34 with the guide member 36 sliding in the guide groove 35 inclined at an angle $\alpha$ with respect to the direction of insertion of the indicating instrument 30 so that the first finger 38 of the lock member 37 comes into engagement with the hook member 26 as shown in FIG. 4B (where l is the distance of insertion of the base plate 34 after the second finger 39 of the lock member 37 first comes into engagement with the hook member 26).

Further, rearward movement of the lock member 37 with respect to the base plate 34 decreases the distance between the rear end of the lock member 37 and the upright wall 43 to deform the leaf spring 40 so as to rotate the hinge members 42 rearward toward the side surfaces of the upright wall 43, whereby the lock member 37 is pulled rearward. Since the first finger 38 of the lock member 37 is held in engagement with the hook member 26, the indicating instrument 30 is instead pulled deeper into the recess 22. The hinge members 42 are held in this position even under vehicle vibrations and thus the indicating instrument is held pulled deeper into the recess 22. Accordingly, the indicating instrument can effectively be prevented from being separated from the instrument panel under vehicle vibrations.

To separate the indicating instrument from the instrument panel, an operator may insert his finger F into the operation hole 32 and the elongated hole 27 as shown by the phantom lines of FIG. 2 and pull the indicating instrument to the arrow direction against the force of the leaf spring 40. This causes outward movement of the base plate 34 relative to the lock member 37 to return the hinge members 42 and the leaf spring 40 to the original position and thus to bring the first finger 38 of the lock member 37 out of engagement with the hook member 26 as shown in FIG. 4A.

While a pair of lock devices are provided on the opposite sides of an indicating instrument in the above embodiment, it is to be understood that only one lock device may be provided on the rear wall of the indicating instrument to obtain a sufficient effect. In addition, while the present invention is illustrated and described as applied to a vehicle indicating instrument mounting structure, it is to be understood, of course, that it is applicable for mounting any other similar instrument to an instrument panel.

What is claimed is:

1. In a structure for mounting an instrument to a recessed instrument panel within the recess thereof, said structure comprising: at least one hook member provided on the inner surface of said recess; and at least one lock device including a base plate secured on said instrument, a lock member supported on said base plate for sliding movement at an angle with respect to the direction of insertion of said instrument into and out of engagement with said hook member, a snap-action mechanism secured on said base plate and coupled to said hook member, and said mechanism having its position changed so as to hold said lock member in engagement with said hook member under a force when said instrument is advanced into said recess to a predetermined position and returned to its original position so as to bring said lock member out of engagement with said hook member when said instrument is retracted against the force from the predetermined position.

2. An instrument mounting structure as set forth in claim 1, wherein said snap-action mechanism comprises a pair of hinge members secured on said base plate, and a leaf spring having its opposite ends pivotably secured to said respective hinge members and having its center fixed to the rear end of said lock member.

3. An instrument mounting structure as set forth in claim 2, wherein said hinge members are connected by a polypropylene hinge to said base plate.

* * * * *